(12) United States Patent
Luthra et al.

(10) Patent No.: US 10,927,046 B2
(45) Date of Patent: *Feb. 23, 2021

(54) EBC WITH MULLITE BONDCOAT HAVING A NON-OXIDE SILICON CERAMIC

(71) Applicant: General Electric Company, Schenectady, NY (US)

(72) Inventors: Krishan Lal Luthra, Schenectady, NY (US); Julin Wan, Rexford, NY (US)

(73) Assignee: General Electric Company, Schenectady, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/229,468

(22) Filed: Dec. 21, 2018

(65) Prior Publication Data

US 2020/0199032 A1 Jun. 25, 2020

(51) Int. Cl.

| C04B 41/52 | (2006.01) |
| C04B 41/00 | (2006.01) |
| C04B 41/45 | (2006.01) |
| C04B 41/50 | (2006.01) |
| C04B 103/60 | (2006.01) |
| C04B 111/00 | (2006.01) |
| C04B 111/20 | (2006.01) |

(52) U.S. Cl.
CPC ............ *C04B 41/52* (2013.01); *C04B 41/009* (2013.01); *C04B 41/4582* (2013.01); *C04B 41/5024* (2013.01); *C04B 41/5059* (2013.01); *C04B 2103/60* (2013.01); *C04B 2111/00482* (2013.01); *C04B 2111/20* (2013.01)

(58) Field of Classification Search
CPC ....................................... C04B 41/52

USPC .......................................................... 428/702
See application file for complete search history.

(56) References Cited

U.S. PATENT DOCUMENTS

| 6,607,852 B2 | 8/2003 | Spitsberg et al. |
| 6,929,852 B2 | 8/2005 | Lane et al. |
| 7,300,702 B2 | 11/2007 | Li et al. |
| 8,658,255 B2 | 2/2014 | Kirby et al. |
| 9,713,912 B2 | 7/2017 | Lee |

(Continued)

FOREIGN PATENT DOCUMENTS

WO WO2017/031163 A1 2/2017

OTHER PUBLICATIONS

Hu et al., Water Vapor Corrosion Behavior and Failure Mechanism of Plasma Sprayed Mullite/Lu2Si2O7—Lu2SiO5 Coatings, Science Direct, Ceramics International, Conference—China, Aug. 15, 2018, vol. 44, Issue 12, pp. 14177-14185. (Abstract Only) https://doi.org/10.1016/j.ceramint.2018.05.020.

(Continued)

*Primary Examiner* — Brent T O'Hern
(74) *Attorney, Agent, or Firm* — Dority & Manning, P.A.

(57) ABSTRACT

A coated component, along with methods of making and using the same, is provided. The coated component includes a ceramic matrix composite (CMC) substrate comprising silicon carbide and having a surface; a mullite/NOSC bondcoat on the surface of the substrate; and an environmental barrier coating on the mullite/NOSC bondcoat. The mullite/NOSC bondcoat comprises a non-oxide silicon ceramic (NOSC) phase contained within a mullite phase, with the mullite/NOSC bondcoat comprising 60% to 95% by volume of the mullite phase, such as 65% to 93% by volume of the mullite phase.

19 Claims, 4 Drawing Sheets

(56) References Cited

U.S. PATENT DOCUMENTS

| | | |
|---|---|---|
| 2002/0025454 A1 | 2/2002 | Wang et al. |
| 2011/0027557 A1* | 2/2011 | Kirby .................. C04B 41/52 |
| | | 428/215 |
| 2014/0272168 A1 | 9/2014 | Lee |
| 2016/0376691 A1 | 12/2016 | Wadley et al. |
| 2020/0199031 A1* | 6/2020 | Luthra .................. C04B 41/89 |

OTHER PUBLICATIONS

Zhu et al., Thermal Conductivity of Ceramic Thermal Barrier and Environmental Barrier Coating Materials, NASA Technical Reports Server, NASA/TM-2001-211122, Sep. 1, 2001, 20 Pages.
U.S. Appl. No. 15/697,895, filed Sep. 7, 2017.
U.S. Appl. No. 15/697,913, filed Sep. 7, 2017.
U.S. Appl. No. 15/697,947, filed Sep. 7, 2017.
European Search Report Corresponding to Application No. 19215421 dated Apr. 16, 2020.

* cited by examiner

EBC WITH MULLITE BONDCOAT HAVING A NON-OXIDE SILICON CERAMIC

FIELD

The present invention generally relates to bondcoats for use with environmental barrier coatings on ceramic components, particularly silicon-based ceramic matrix components, along with methods of their formation and use.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from super alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials, in particular silicon carbide (SiC) fiber reinforced SiC and SiC/Si matrix composites, so called SiC/SiC composites. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide. To prevent recession in moist, high temperature environments, environmental barrier coatings (EBC's) are deposited onto silicon carbide and silicon nitride materials.

Currently, EBC materials are made out of rare earth silicate compounds. These materials seal out water vapor, preventing it from reaching the silicon oxide scale on the silicon carbide or silicon nitride surface, thereby preventing recession. Such materials cannot prevent oxygen penetration, however, which results in oxidation of the underlying substrate. Oxidation of the substrate yields a passive silicon oxide scale, along with the release of carbonaceous or nitrous oxide gas. The carbonaceous (i.e., $CO$, $CO_2$) or nitrous (i.e., $NO$, $NO_2$, etc.) oxide gases cannot escape out through the dense EBC and thus, blisters form, which can cause spallation of the EBC. The use of a silicon bondcoat has been the solution to this blistering problem to date. The silicon bondcoat provides a layer that oxidizes (forming a passive silicon oxide layer beneath the EBC) without liberating a gaseous by-product.

However, the presence of a silicon bondcoat limits the upper temperature of operation for the EBC because the melting point of silicon metal is relatively low. In use, the silicon bondcoat melts at coating temperatures of about 1414° C., which is the melting point of silicon metal. Above these melting temperatures, the silicon bondcoat may delaminate from the underlying substrate, effectively removing the bondcoat and the EBC thereon. As such, it is desirable to have improved bondcoats in the EBC to achieve a higher operational temperature limit for the EBC.

BRIEF DESCRIPTION

Aspects and advantages of the invention will be set forth in part in the following description, or may be obvious from the description, or may be learned through practice of the invention.

A coated component is generally provided, along with methods of making and using the same. In one embodiment, the coated component includes a ceramic matrix composite (CMC) substrate comprising silicon carbide and having a surface; a mullite/NOSC bondcoat on the surface of the substrate; and an environmental barrier coating on the mullite/NOSC bondcoat. The mullite/NOSC bondcoat comprises a non-oxide silicon ceramic (NOSC) phase contained within a mullite phase, with the mullite/NOSC bondcoat comprising 60% to 95% by volume of the mullite phase, such as 65% to 93% by volume of the mullite phase (e.g., 75% to 90% by volume of the mullite phase).

In certain embodiments, the mullite phase includes alumina and silica in a stoichiometric ratio within 10% of 3 to 2, such as about 3 to 2 up to about 3.5 to 2. In other embodiments, the mullite phase includes alumina and silica in a stoichiometric ratio within 10% of 2 to 1, such as about 2 to 1 up to about 2.25 to 1. In particular embodiments, the mullite phase may consists of alumina and silica.

In certain embodiments, the NOSC phase may include silicon carbide, silicon nitride, silicon oxycarbide, silicon oxynitride, or a mixture thereof. For instance, the mullite/NOSC bondcoat may include 5% to 40% by volume NOSC, such as 7% to 35% by volume NOSC (e.g., 10% to 25% by volume NOSC).

The environmental barrier coating may include a plurality of layers with at least one of the layers of the environmental barrier coating comprises a porous layer, such as a porous layer with interconnected porosity. In another embodiment, all of the layers may have interconnected porosity. In one particular embodiment, the porous layer may be adjacent to the mullite/NOSC bondcoat such that the porous layer defines the inner surface of the environmental barrier coating. For instance, the porous layer may include an aluminum oxide.

The mullite/NOSC bondcoat may be configured to withstand exposure to operating temperatures of up to 1650° C.

In one embodiment, a method is provided for forming a coated component. For example, the method may include forming a mullite/NOSC bondcoat on a surface of a substrate and forming an environmental barrier coating on the mullite/NOSC bondcoat. The mullite/NOSC bondcoat includes a NOSC phase contained within a mullite phase, and the mullite/NOSC bondcoat comprises 60% to 95% by volume of the mullite phase.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "RE" refers to a rare earth element or a mixture of rare earth elements. More specifically, the "RE" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, the term "substantially free" means no more than an insignificant trace amount present and encompasses completely free (e.g., 0 molar % up to 0.01 molar %).

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

A coated component is generally provided that includes a mullite bondcoat having a non-oxide silicon ceramic ("NOSC") contained therein. The mullite bondcoat including a non-oxide silicon ceramic (referred to herein as a "mullite/NOSC bondcoat") is generally positioned between the surface of the substrate and an environmental barrier coating (EBC) thereon. Generally, the mullite/NOSC bondcoat is formed from a non-oxide, silicon ceramic (e.g., silicon carbide, silicon nitride, silicon carbonitride, silicon oxycarbide, silicon oxynitride, and/or mixtures thereof) that serves as a sacrificial material to react with oxygen in service to form a gaseous oxide (e.g., carbon oxides and/or nitrous oxides) that can escape through the overlying EBC layers. Thus, oxidation of the underlying substrate may be prevented.

Figure 1:
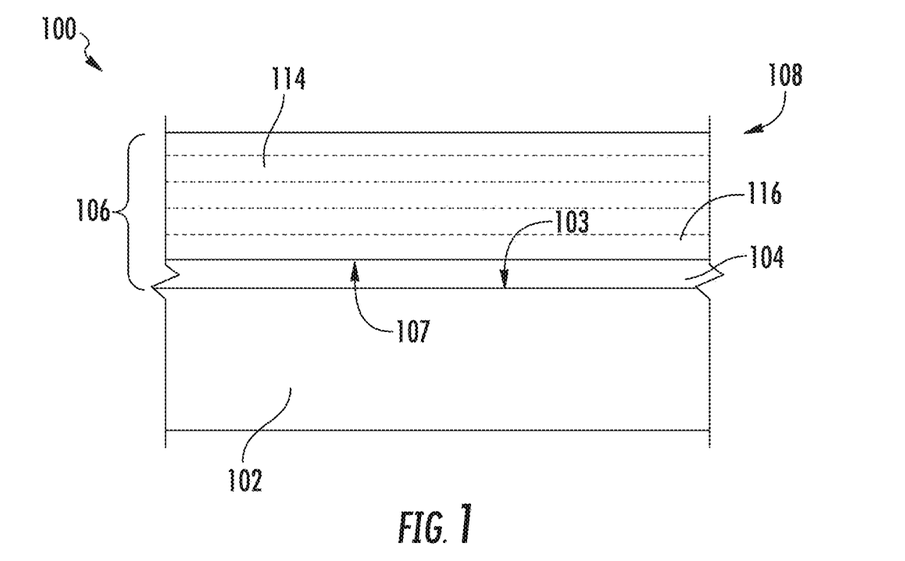
FIG. 1 is a cross-sectional side view of an exemplary coated component including a mullite bondcoat including a non-oxide silicon ceramic.

Referring to FIG. 1, an exemplary coated component 100 is shown formed from a substrate 102 having a surface 103 with a coating system 106 thereon. The substrate 102 is formed from a ceramic matrix composite ("CMC") material, such as a silicon based, non-oxide ceramic matrix composite. As used herein, "CMC" refers to a silicon-containing, or oxide-oxide, matrix and reinforcing material. As used herein, "monolithic ceramics" refers to materials without fiber reinforcement (e.g., having the matrix material only). Herein, CMCs and monolithic ceramics are collectively referred to as "ceramics." In particular embodiments, the CMC substrate 102 includes silicon carbide (SiC) within its ceramic matrix and fibers (when present).

Generally, the coating system 106 includes a mullite/NOSC bondcoat 104 on the surface 103 of the substrate, and an EBC 108 on the surface 107 of the mullite/NOSC bondcoat 104. In the embodiment shown, the mullite/NOSC bondcoat 104 is directly on the surface 103 without any layer therebetween.

Figure 2:
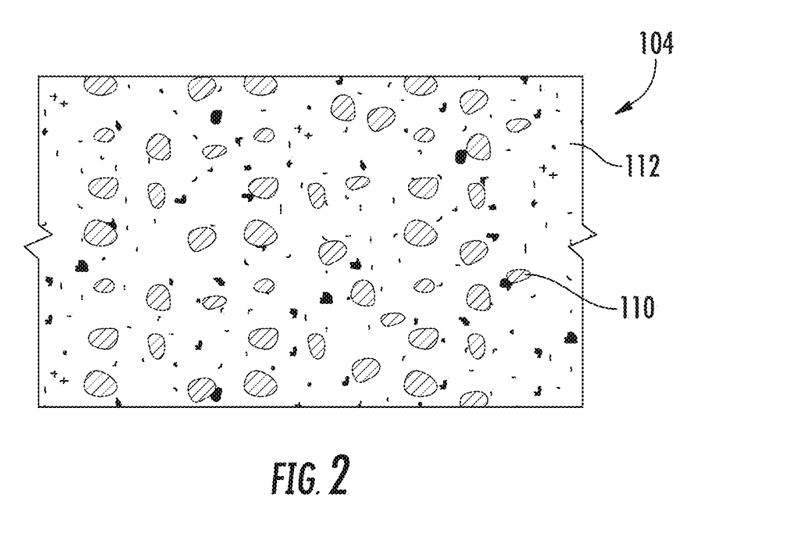
FIG. 2 is a cross-sectional side view of an exemplary mullite bondcoat including a non-oxide silicon ceramic having with a continuous mullite phase with discrete non-oxide silicon ceramic-phases dispersed therein.

In the exemplary embodiment of FIG. 2, the mullite/NOSC bondcoat 104 has a continuous mullite phase 112 with discrete NOSC-phases 110 dispersed therein. Although shown as discrete NOSC-phases 110, some continuity of the NOSC-phase is acceptable, particularly at NOSC concentration above about 10% by volume or above about 15% by volume. For example, the NOSC material may form particles that touch each other within the mullite phase, becoming continuous in nature. In other embodiments, the mullite/NOSC bondcoat 104 has a continuous mullite phase 112, while the NOSC phase 110 is also interconnected and continuous therein.

Mullite generally has a relatively slow diffusion rate for oxygen at all temperatures of interest, even up to about 1650° C. (e.g., about 1200° C. to about 1650° C.). At temperatures over about 1200° C., it is believed that the only other crystalline oxide that has lower oxygen diffusion rate than mullite is alumina, which has a very high expansion coefficient compared to the substrate and cannot be deposited as dense coatings without spallation. Although mullite has a coefficient of thermal expansion ("CTE") that is similar to that of SiC CMC substrates 102, the CTE of mullite is not an exact match to SiC. The slight mismatch of CTE of mullite and SiC could lead to problems related to thermal expansion, such as cracking and/or delamination, if the mullite/NOSC bondcoat 104 is too thick. For example, it is believed that a mullite/NOSC bondcoat 104 having a thickness of 20 mils (i.e., 508 µm) would lead to problems related to the CTE mismatch after repeated exposure to the operating temperatures. On the other hand, it is believed that a mullite/NOSC bondcoat 104 having a maximum thickness of 10 mils or less, such as 1 mil to 10 mils (i.e., 254 µm or less, such as 25.4 µm to 254 µm), would survive such operating temperatures without significant problems from the CTE mismatch. In one particular embodiment, the mullite/NOSC bondcoat 104 has a maximum thickness of 5 mils, such as 3 mils to 5 mils (i.e., 127 µm, such as 76.2 µm to 127 µm).

The mullite phase 112 is included in the mullite/NOSC bondcoat 104 in an amount to provide structural integrity to the mullite/NOSC bondcoat 104 while the NOSC phase 110 is sacrificed over multiple exposures to oxygen at operating temperatures. As such, at least 60% of the mullite/NOSC bondcoat 104 may be mullite. In particular embodiments, the mullite/NOSC bondcoat 104 may include 60% to 95% by volume mullite, such as 65% to 93% by volume mullite (e.g., 75% to 90% by volume mullite).

Conversely, the NOSC phase 110 is included in the mullite/NOSC bondcoat 104 in an amount sufficient to serve as a sacrificial oxygen getter. In one particular embodiment, the NOSC phase 110 may be formed from silicon carbide (i.e., SiC), silicon nitride (i.e., $Si_3N_5$), or a mixture thereof. Both SiC and SiN have melting temperatures that are sufficient to prevent melting at the operating temperatures, and both will react to oxygen to form gaseous oxides (e.g., carbon oxides and nitrous oxides, respectively) that can be vented from the porous EBC. As such, the NOSC phase 110 prevents oxygen from reaching to the underlying substrate 102.

For example, the mullite/NOSC bondcoat 104 may, in certain embodiments, include 5% to 40% by volume of the NOSC phase 110, such as 7% to 35% by volume of the NOSC phase 110 (e.g., 10% to 25% by volume of the NOSC phase 110). In particular embodiments, for example, the NOSC phase 110 may include 5% to 40% by volume of SiC, such as about 7% to 35% by weight of SiC (e.g., 10% to 25% by volume of SiC).

In particular embodiments, the mullite phase 112 is formed from crystallized mullite having a melting temperature that is about 1825° C. to 1860° C. (e.g., about 1840° C.), and is generally unreactive with the NOSC phase 110 (e.g., SiC).

Mullite is a chemical compound of alumina and silica with an alumina ($Al_2O_3$) and Silica ($SiO_2$) ratio of about 3 to 2 (e.g., within 10 mole % of 3 to 2 of alumina to silica). A ratio of about 2 to 1 has also been reported (e.g., within 10 mole % of 2 to 1 of alumina to silica). In one embodiment, the mullite layer may contain excess of alumina, up to about 10 mole % of excess alumina. For example, the mullite phase may include alumina and silica in a stoichiometric ratio of about 3 to 2 up to about 3.5 to 2 or in a stoichiometric ratio of about 2 to 1 up to about 2.25 to 1. In another embodiment, the mullite layer may contain excess of silica. If there is excess silica, it should preferably be not continuous. As used here, "alumina" refers to aluminum oxide in the form of $Al_2O_3$. As used here, "silica" refers to silicon oxide in the form of $SiO_2$.

In one embodiment, a thermally grown oxide ("TGO") layer may form directly on the outer surface of the NOSC phase 110, such as a layer of silicon oxide (sometimes referred to as "silicon oxide scale" or "silica scale"), during exposure to oxygen (e.g., during manufacturing and/or use) of the component 100.

As stated above, the substrate 102 may be formed from a CMC material, such as a silicon based, non-oxide ceramic matrix composite. Some examples of CMCs acceptable for use herein can include, but are not limited to, materials having a matrix comprising non-oxide silicon-based materials such as silicon carbide, silicon nitride, silicon oxycarbides, silicon oxynitrides, and mixtures thereof. Some examples of CMCs acceptable for use herein can include, but are not limited to, materials having reinforcing fibers comprising carbon fibers and/or non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; Si—SiC matrix and silicon carbide fiber; silicon carbide matrix and carbon fiber; silicon nitride matrix and silicon carbide fiber; and silicon carbide/silicon nitride matrix mixture and silicon carbide fiber. In one particular embodiment, the matrix material of the substrate 102 may be substantially identical in composition to the NOSC material within the NOSC phase 110. For example, both the matrix material of the substrate 102 and the NOSC material within the NOSC phase 110 may be SiC.

As stated above, the mullite/NOSC bondcoat 104 may be used in conjunction with an EBC 108 to form a coated component 100 with an increased operating temperature compared to that using a silicon bondcoat. The EBC 108 may include any combination of one or more layers formed from materials selected from typical EBC or thermal barrier coating ("TBC") layer chemistries, including but not limited to rare earth silicates (e.g., mono-silicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc.

The microstructure requirements of the outer coating may depend upon the amount of NOSC in mullite/NOSC bondcoat 104. For example, when the NOSC includes SiC, the microstructure requirements of the outer coating may depend upon the amount of SiC in the mullite/NOSC bondcoat 104 (i.e., in the mullite/SiC bondcoat of this embodiment). For small amounts of SiC, the amount of CO gas formation may be small enough that it would cause localized blistering only, rather than spallation of the outer layers, if the outer layers are fully dense and do not allow the CO gas to escape. Therefore, in one embodiment, the outer EBC layers contain at least one dense, hermetic layer. On the other hand, if the concentration of SiC is fairly high (for example, over about 20 mole percent, or over about 30 mole %), the amount of CO gas formation may be significant enough to cause the spallation of the outer layers. Therefore, in such embodiments, the outer EBC layers may contain enough porosity to provide a continuous path for CO to escape. The amount of total porosity should preferably be as low as possible but high enough to form a continuous path for CO to escape, which may happen at porosity levels of over about 10 volume percent.

The EBC 108 may be formed from a plurality of individual layers 114. In the embodiments shown, EBC 108 includes a porous layer 116 with interconnected porosity positioned in directly on the mullite/NOSC bondcoat 104. The porous layer 116 allows for gaseous oxides to escape the EBC 108 upon their formation in the mullite/NOSC bondcoat 104. In one embodiment, each of the layers 114 of the EBC 108 are porous layers 116.

The coated component 100 is particularly suitable for use as a component found in high temperature environments, such as those present in gas turbine engines, for example, combustor components, turbine blades, shrouds, nozzles, heat shields, and vanes. In particular, the turbine component can be a CMC component 100 positioned within a hot gas flow path of the gas turbine such that the coating system 106 forms an environmental barrier for the underlying substrate 102 to protect the component 100 within the gas turbine when exposed to the hot gas flow path. In certain embodiments, the mullite/NOSC bondcoat 104 is configured such that the coated component 100 is exposed to operating temperatures of about 1475° C. to about 1650° C.

Figure 3:
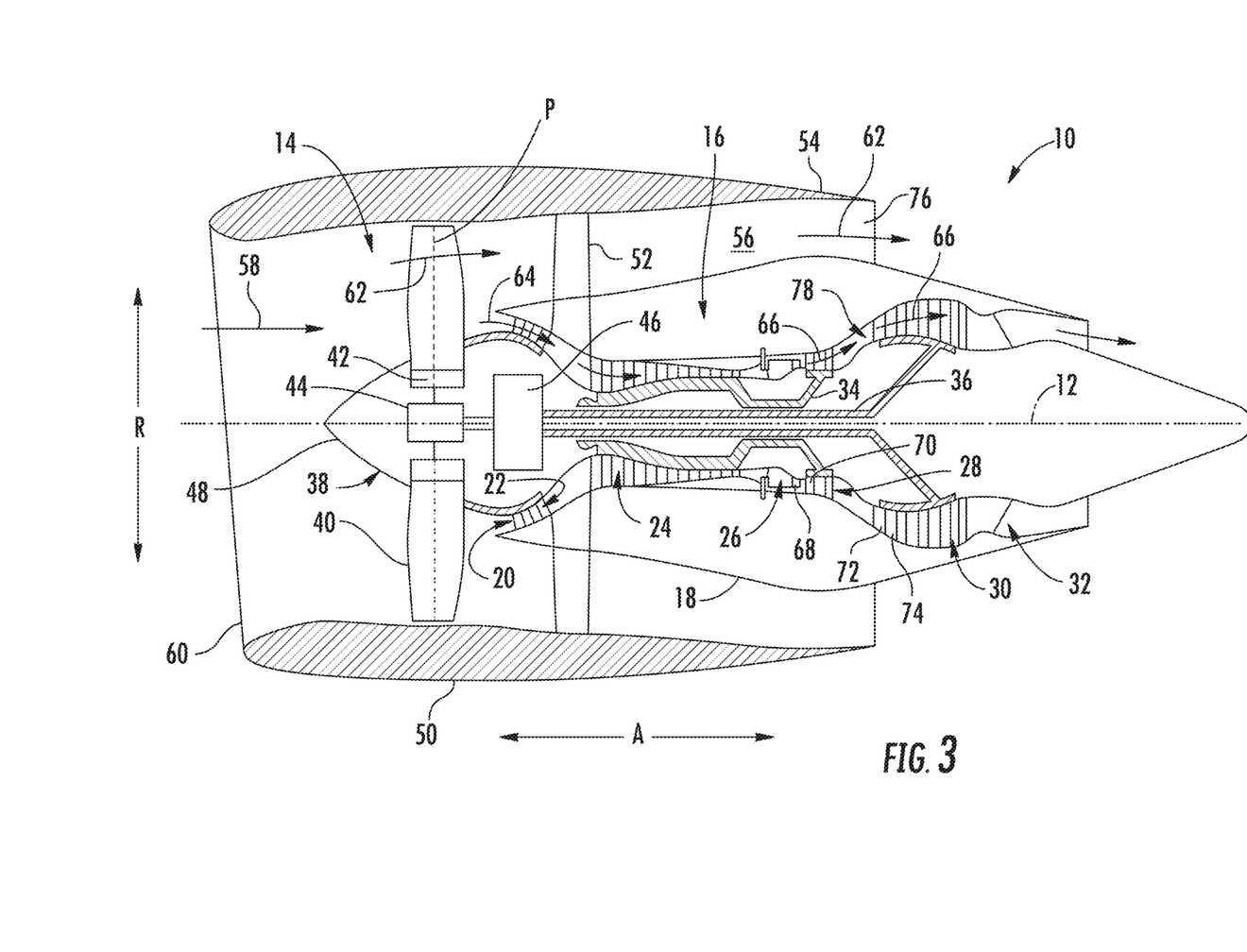
FIG. 3 is a schematic cross-sectional view of an exemplary gas turbine engine according to various embodiments of the present subject matter.

FIG. 3 is a schematic cross-sectional view of a gas turbine engine in accordance with an exemplary embodiment of the present disclosure. More particularly, for the embodiment of FIG. 3, the gas turbine engine is a high-bypass turbofan jet engine 10, referred to herein as "turbofan engine 10." As shown in FIG. 3, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 3, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 4:
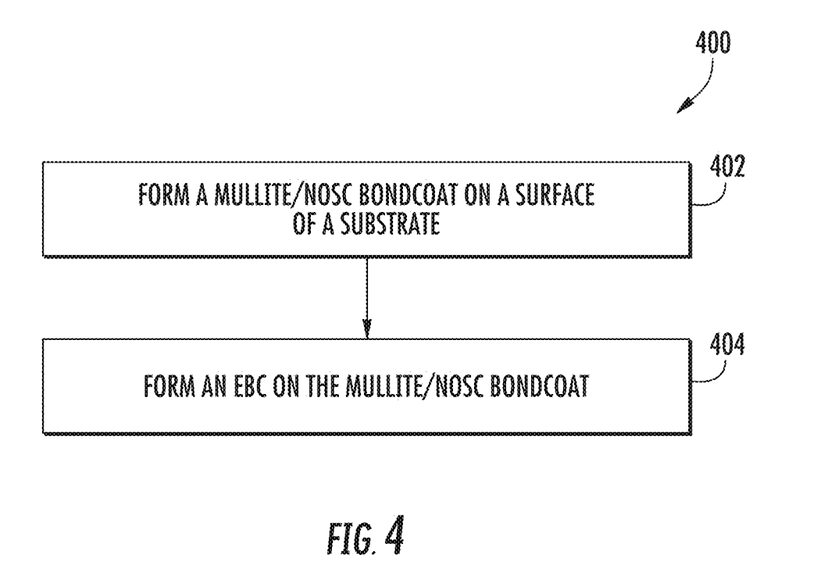
FIG. 4 is a diagram of an exemplary method of forming a mullite bondcoat including a non-oxide silicon ceramic.

Methods are also generally provided for coating a ceramic component. For example, FIG. 4 shows a diagram of an exemplary method 400 of forming a coating system on a surface of a substrate. At 402, a mullite/NOSC bondcoat is formed on the surface of the substrate to include a NOSC phase contained within a mullite phase, such as described above with respect to mullite/NOSC bondcoat 104.

In one embodiment, the mullite/NOSC bondcoat is formed by air plasma spray. In another embodiment, it is formed by suspension plasma spray where a liquid suspension of the desired chemistry is used for air plasma spray. In still another embodiment, the coating is formed by low pressure plasma spray. In yet another embodiment one or more of the coated layers may be formed by a slurry coating process followed by sintering of the layer. Different coating layers may be formed by one or more of these processes.

At 404, an environmental barrier coating (EBC) is formed on the mullite/NOSC bondcoat. As described above, gaseous carbides are allowed to vent through the EBC.

EXAMPLES

Figure 5:
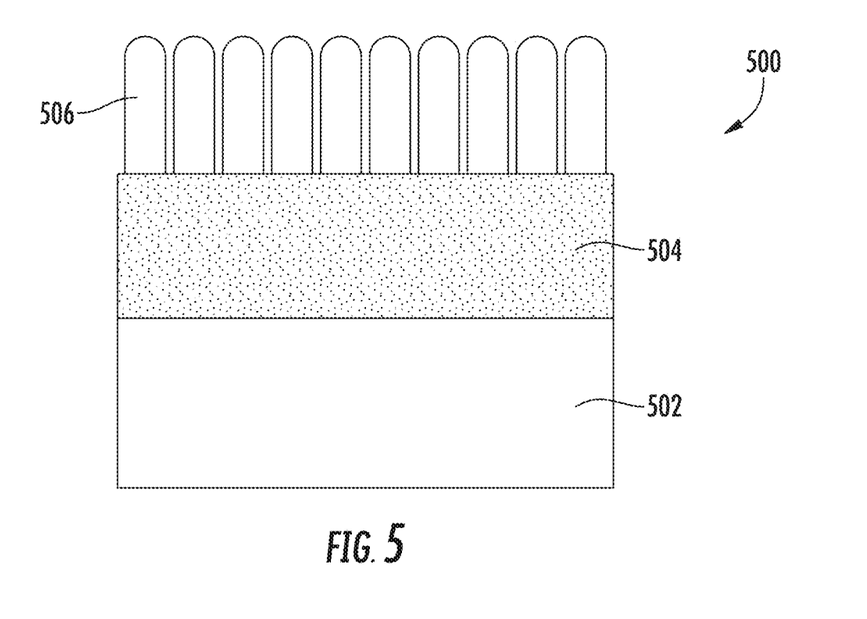
FIG. 5 shows a schematic diagram of an exemplary coated component formed according to the examples.

FIG. 5 shows an EBC 500 applied over a CMC substrate 502, where the EBC 500 included a bond coat 504 having a biphasic structure of mullite and silicon carbide, and a permeable outer layer 506. The bond coat 504 is applied directly on the CMC substrate 502. Silicon carbide in the bond coat 504 serves as the oxygen getter to prevent oxygen from attacking the substrate 502, upon oxidation, silicon carbide converts to silicon oxide (silica) and releases CO gas. Mullite serves as the matrix, and was selected based on its low oxygen permeability. In this configuration, the phase of silica oxidation product has certain degree of continuity so that by its recession and microcracking, CO has a pathway to get out of the bond coat. The outer layer 506 is designed to be permeable so that CO that is generated in the bond coat 504 can escape into the environment. The outer layer 506 can contain several sublayers of oxides, and gas permeability can be realized by a porous or columnar structure.

Figure 6A:
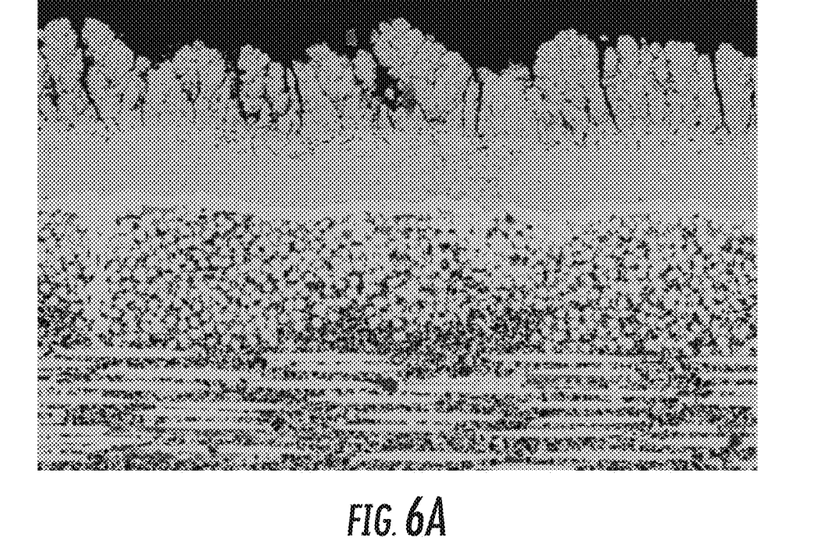
FIG. 6A shows a cross section of an exemplary coated component made according to the Examples and having a bond coat of mullite and SiC with an upper layer formed from columnar alumina layer.
Figure 6B:
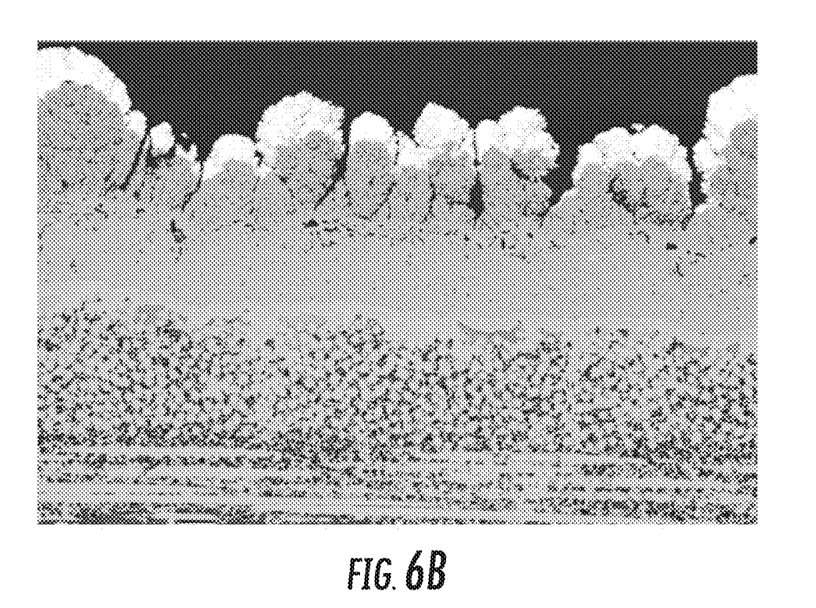
FIG. 6B shows a cross section of an exemplary coated component made according to the Examples and having a bond coat of mullite and SiC with an upper layer being a combination of columnar alumina and YSZ sublayers.

The architecture schematically shown in FIG. 5 was formed using a slurry plasma spray, as shown in the examples in FIG. 6A and FIG. 6B. In the embodiment of FIG. 6A, the upper layer was formed from a columnar alumina layer. In the embodiment of FIG. 6B, the upper layer was formed from a combination of columnar alumina and YSZ (Yttria Stabilized Zirconia) sublayers. Both of these coatings were tested to evaluate several characteristics, including recession resistance under cyclic conditions, thermal shock resistance, and gas erosion resistance. These characteristics are evaluated by cyclic steam rig testing, JETs and HVOF testing, and interlaced testing combining these techniques. The coatings consistently demonstrated recession resistance of more than 500 hours in 2700° F. (about 1482° C.) cyclic steam test, the longest steam test went up to 1000 hours. Post-testing characterization of the cross-sections of the tested samples showed acceptable progression of degradation.

The coating systems in FIGS. 6a and 6b are Mullite-SiC/ $Al_2O_3$ and Mullite-SiC/$Al_2O_3$/YSZ. Other examples of the coating architectures are Mullite-SiC/$HfO_2$ and Mullite-SiC/ $Al_2O_3$/$HfO_2$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component comprising:
   a ceramic matrix composite (CMC) substrate comprising silicon carbide and having a surface;
   a mullite/NOSC bondcoat on the surface of the substrate, wherein the mullite/NOSC bondcoat comprises a non-oxide silicon ceramic (NOSC) phase contained within a mullite phase, and wherein the mullite/NOSC bondcoat comprises 60% to 95% by volume of the mullite phase; and
   an environmental barrier coating on the mullite/NOSC bondcoat.

2. The coated component as in claim 1, wherein the mullite/NOSC bondcoat comprises 65% to 93% by volume of the mullite phase.

3. The coated component as in claim 1, wherein the mullite/NOSC bondcoat comprises 75% to 90% by volume of the mullite phase.

4. The coated component as in claim 1, wherein the mullite phase comprises alumina and silica in a stoichiometric ratio within 10% of 3 to 2.

5. The coated component as in claim 1, wherein the mullite phase comprises alumina and silica in a stoichiometric ratio within 10% of 2 to 1.

6. The coated component as in claim 1, wherein the mullite phase consists of alumina and silica.

7. The coated component as in claim 1, wherein the mullite phase comprises alumina and silica in a stoichiometric ratio of about 3 to 2 up to about 3.5 to 2.

8. The coated component as in claim 1, wherein the mullite phase comprises alumina and silica in a stoichiometric ratio of about 2 to 1 up to about 2.25 to 1.

9. The coated component as in claim 1, wherein the NOSC phase comprises silicon carbide, silicon nitride, silicon oxycarbide, silicon oxynitride, or a mixture thereof.

10. The coated component as in claim 1, wherein the NOSC phase consists of silicon carbide.

11. The coated component as in claim 1, wherein the mullite/NOSC bondcoat comprises 5% to 40% by volume NOSC.

12. The coated component as in claim 1, wherein the mullite/NOSC bondcoat comprises 7% to 35% by volume NOSC.

13. The coated component as in claim 1, wherein the mullite/NOSC bondcoat comprises 10% to 25% by volume NOSC.

14. The coated component as in claim 1, wherein the mullite phase is a continuous phase, and wherein a plurality of discrete NOSC phases are dispersed within the mullite phase.

15. The coated component as in claim 1, wherein the mullite phase is a continuous phase, and wherein the NOSC phase is also interconnected and continuous.

16. The coated component as in claim 1, wherein the environmental barrier coating comprises a plurality of layers with at least one of the layers of the environmental barrier coating comprises a porous layer with interconnected porosity.

17. The coated component as in claim 16, wherein all of the layers have interconnected porosity.

18. The coated component as in claim 16, wherein the porous layer is adjacent to the mullite/NOSC bondcoat such that the porous layer defines an inner surface of the environmental barrier coating, and wherein the porous layer comprises an aluminum oxide.

19. The coated component as in claim 1, wherein the mullite/NOSC bondcoat is configured to withstand exposure to operating temperatures of up to 1650° C.

* * * * *